March 8, 1949. T. M. FERRILL, JR 2,463,529
CRAFT INDICATING SYSTEM
Filed Aug. 30, 1945 2 Sheets-Sheet 2

INVENTOR
Thomas M. Ferrill, Jr.
BY
ATTORNEY.

Patented Mar. 8, 1949

2,463,529

UNITED STATES PATENT OFFICE 2,463,529

CRAFT INDICATING SYSTEM

Thomas M. Ferrill, Jr., Hempstead, N. Y., assignor to The Sperry Corporation, a corporation of Delaware Application August 30, 1945, Serial No. 613,601

12 Claims. (Cl. 343—120)

This invention relates generally to craft guidance and has reference more particularly to a method of and apparatus for denoting the proper approach of a craft to a desired flight path.

It is common practice for aircraft to fly by instruments along flight paths or lines defined at least in part by radio transmission. The equisignal zones created by the well known radio ranges are examples of such lines or paths. Here distinctively modulated, partially overlapping beams of radio frequency energy are radiated to establish horizontal guidance for aircraft travelling along airways. Vertical as well as horizontal positional information is customarily provided by radio instrument landing systems, where one or more radio beams are employed to permit a craft to descend along a predetermined glide line until contact is made with a runway.

It is often necessary for a pilot to maneuver his craft onto such a predetermined line of flight from a position displaced therefrom. The pilot knows the direction of the flight line in the horizontal plane, for example, with reference to north, and its inclination with respect to the horizon. The craft is normally provided with attitude instruments such as a directional gyroscope or compass and an artificial gyro horizon or attitude gyro. The displacement of the craft from the desired path is revealed by a visual indicator. The problem confronting the pilot is to bring the craft into the flight line and at the same time substantially align the attitude of the craft with this line to overcome any tendency for further departure.

An experienced pilot notes the extent of displacement of his craft from the flight line, and adjusts the attitude of the craft to be angularly disposed to the flight line, so that continued flight in the direction of the adjusted attitude would cause the craft to pass through the flight line. Then, as the craft approaches the flight line, as indicated by decreasing deflection of the visual displacement indicator, the pilot modifies the craft attitude, bringing it more nearly parallel to the flight line, and consequently reducing the rate at which the displacement of the craft from the flight line is diminished. In this manner, a pilot experienced in instrument flight and instrument landings is able to bring his craft into a predetermined radio-defined flight line along a substantially asymptotically curved course, and to avoid successively crossing the flight line, or "hunting."

Unless, however, a pilot has great experience in anticipating the required correction to the craft's attitude, there is a tendency for the craft to oscillate or "hunt" on either side of the predetermined line of flight in a manner that is disconcerting to the pilot, since it is difficult to maneuver a craft in such a way that its attitude will be properly adjusted for movement along the flight line at the time when the craft reaches a point on the flight line.

Various attempts have been made in the past to overcome this difficulty of "hunting," and to provide a system of indications such as to permit accurate, smoothly controlled instrument flight and instrument landings executed by pilots having only brief experience in reliance upon flight instruments. As a result of these efforts, apparatus or systems have been provided combining algebraically directional signals derived from a radio direction finder or other direction indicator with positional signals obtained from a radio range receiver for revealing by a null indication a satisfactory approach to the equisignal line created by the radio beams, and including various switching arrangements whereby selective signals may be impressed upon other indications giving additional information distinctly uncorrelatable with the null indication.

A limitation of such apparatus is the fact that the combined indication per se fails to show definite and distinct attitude and positional information. Thus, a pilot observing a centered meter pointer, for example, knows that the craft is travelling smoothly along a predetermined line of flight, or that the craft is displaced from the predetermined line of flight but is properly directed to return to the flight line. He must seek elsewhere for knowledge of the craft's actual heading, and for a measure of craft displacement from the flight line. This additional knowledge was, therefore, uncorrelated. Under cross-wind conditions a craft maneuvered in reliance only upon such a combined indication will be guided along a path displaced from the predetermined line of flight, even though the craft is operated in such a way as to maintain the pointer centered in the normal position.

It is, therefore, the primary object of the present invention to provide a novel method of craft guidance and improved instrumentalities for revealing the satisfactory approach of a craft to a predetermined line of travel.

A feature of the present invention is the provision of an aircraft flight indicating system for indicating the displacement of a craft relative to a predetermined line of travel and for indicating the attitude to which the craft should be adjusted to provide a smooth approach of the craft to the predetermined line of travel.

A further feature of the present invention is the provision of an improved aircraft flight indicating system for indicating the attitude of a craft and its position relative to a desired line of flight by means of indications whose magnitudes are so proportioned that equality thereof denotes a satisfactory approach to the desired flight line.

Another feature of the present invention is the provision of an improved aircraft flight indicator of the cathode ray type for indicating the attitude and position of a craft relative to a desired line of flight by means of electron beam traces on a fluorescent screen of a cathode ray tube, whose movements are so correlated that either a predetermined relative displacement between said traces or a superposing of same, denotes a satisfactory approach to a desired flight path.

Still another feature of the present invention is the provision of an improved aircraft flight indicating system for indicating the attitude and displacement of a craft relative to a desired line of flight by means of indicia whose deflections are so correlated that when the craft attitude is changed to reduce the craft's displacement the respective indicia move toward each other, a satisfactory approach to the desired line of flight being denoted by the juxtapositioning of the indicia.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other features of the invention include a navigation instrument indicating the horizonal and vertical angular displacement or attitude of a craft relative to a predetermined path of travel, and the provision of means for producing a single indication on a screen to represent the craft's vertical and azimuthal attitudes at any instant of flight; the construction of a flight indicator of the character that simultaneously enables the observer to obtain a single indication of the azimuthal and pitch attitudes of the craft and a single indication of the craft's position relative to a predetermined line of flight.

Generally speaking, the invention contemplates providing a craft guidance system adapted to reveal in a common viewing area indications or representations of craft attitude and position relative to a desired line of travel. These indications or representations, which may take the form of meter pointers on a dial or luminous traces on a screen, move from their respective reference or zero signal positions, for example, the center of meter dial or screen, in accordance with position and attitude error signals, respectively. The position error signal is generated in dependence upon the deviation in position of the craft from the desired travel line, while the attitude signal is dependent upon the divergence in attitude of the craft from a direction parallel to this line of travel. These signals are supplied in such proportion and sense that a convergence of the craft toward the travel line suitable to overcome an instant deviation therefrom is revealed by equal displacements or superposition of the indications or representations from their respective zero signal positions.

The invention will be more fully understood by reference to the specific embodiment illustrated in the drawings and to the following description thereof.

In the drawings,

Figs. 3 to 6 are views of the face of the flight indicator of Fig. 1 showing the indications of the device under varying flight conditions.

The embodiment that has been chosen to illustrate the invention is a flight indicating system of the general type disclosed in U. S. Patent 2,262,033 for Aircraft flight indicator and control system therefor, issued November 11, 1941, in the name of Francis L. Moseley, and U. S. Patent 2,262,245 for Cathode rayflight indicator, issued November 11, 1941, in the name of said Moseley and Joseph Lyman. In such an indicating system, individually distinctive patterns representative of several instruments responsive to flight conditions are traced on a screen of a cathode ray tube in rapidly repeated sequence to cause patterns to be simultaneously visible, the patterns collectively constituting under the ultimately desired flight conditions a symmetrical assembly whose symmetry is destroyed under flight conditions other than the desired ones according to the responses of the several instruments.

Figure 1:
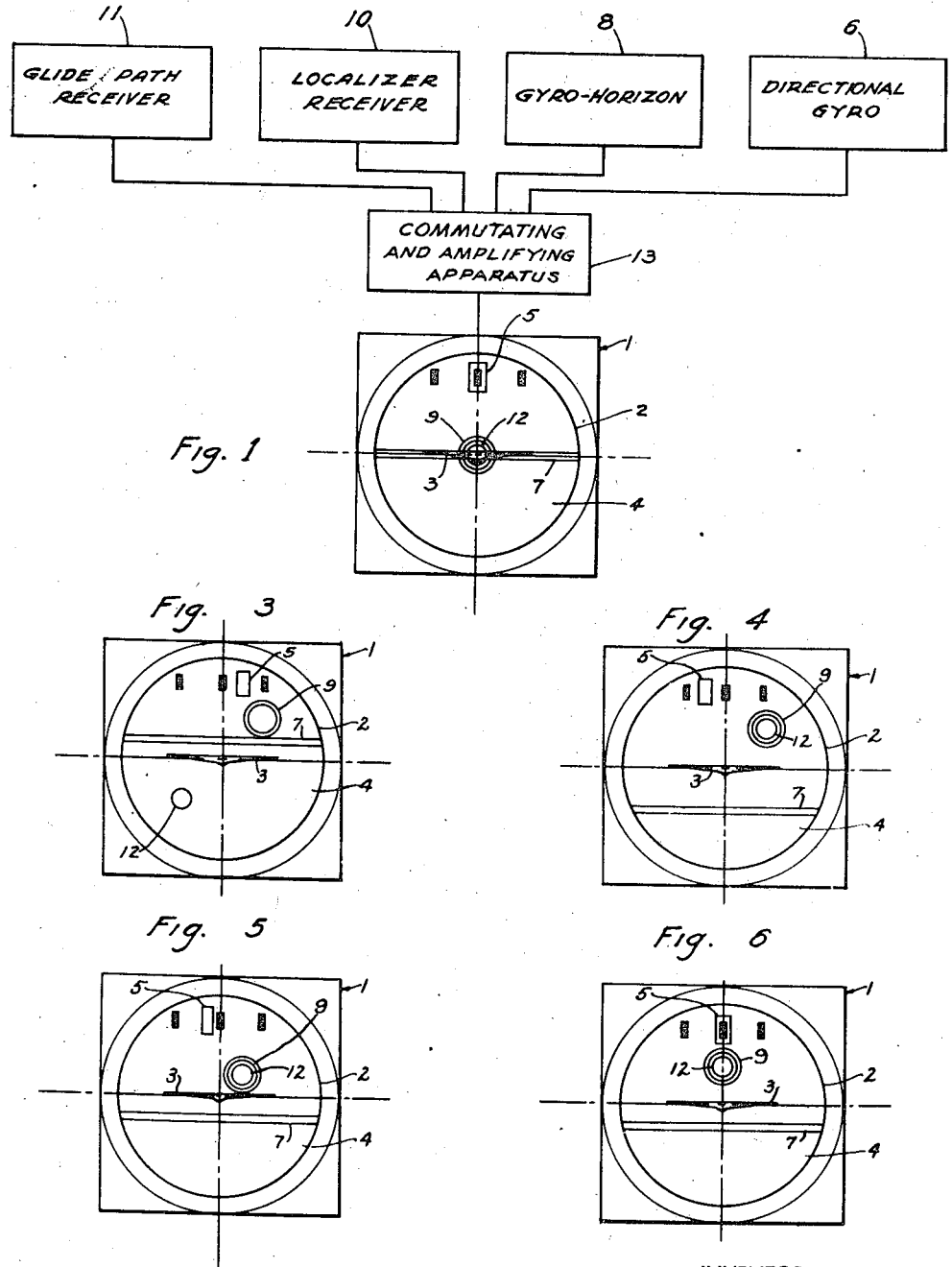
Fig. 1 is a block diagram illustrating a form of the invention particularly adapted to aircraft flight indication.

Referring now to Fig. 1, a flight indicator 1 is provided with a circular aperture 4 through which the face of a cathode ray tube 2 is visible. A silhouette or stylized representation 3 of an aircraft is disposed in the center of the face. The aircraft silhouette possesses wings which indicate a line parallel to the transverse axis of the aircraft and are used in conjunction with a normally horizontal trace 7 of the cathode beam which serves to indicate the horizon line. This trace 7 is adapted to rise or drop according to whether the nose of the craft pitches below or above, respectively, the horizontal plane. The trace 7 is further caused to pivot about its center in accordance with roll of the craft.

A short vertical trace 6 normally centered at the top of the tube face is arranged to move horizontally to the right or left in accordance with deviation in the craft heading to the left or right, respectively, of some predetermined heading which may be chosen by the pilot. A scale associated with the directional trace 6 reveals the approximate divergence from the desired heading.

A circular cathode ray trace 9 is normally located concentric with the craft silhouette and is caused to move from the normal position in accordance with deviation of the craft from the flight line defined, for example, by partially overlapping radio beams transmitted from an airport by instrument landing radio equipment located thereon.

In accordance with the teachings of the present invention, a further fluorescent trace or spot 12 is provided which is made to move up or down and left or right in accordance with the pitch and azimuthal heading, respectively, of the aircraft. The sense of movement of the attitude trace 12 and the ratio of its displacement to change in craft attitude are such that a craft attitude satisfactory for correcting a deviation in position of the craft from the flight line is indicated by a concentric or superposed relationship between the attitude spot 12 and the circular trace 9. Thus, the horizon line 7 and direction bar 5 may be retained with their conventional sensing while revealing in a convenient and unequivocal manner whether the craft attitude is suitable for bringing the craft smoothly to the flight line.

Horizon line 7, direction bar 5, positional circle 9, and attitude spot 12 are successively drawn on the cathode ray tube 2 by means of electrical signals provided by a commutating and implifying apparatus 13. The deflection of these traces indicating the mentioned flight conditions is provided by combining in apparatus 13 the trace drawing signals with deflection signals which are produced by instruments sensitive to flight conditions. A horizon defining instrument such as a gyro-horizon 8 controls the deflection of line 7, a direction giving apparatus such as directional gyroscope 6 controls the bar 5, a vertical position determining device in the form of a glide path receiver 11 and a horizontal position determining device in the form of a localizer receiver 10 control the position of the circle 9, and spot 12 is displaced in accordance with the directional and pitch responses of gyroscopes 6 and 8, respectively. The cooperation of these devices to create the desired flight indication is discussed in detail with reference to Fig. 2.

Figure 2:
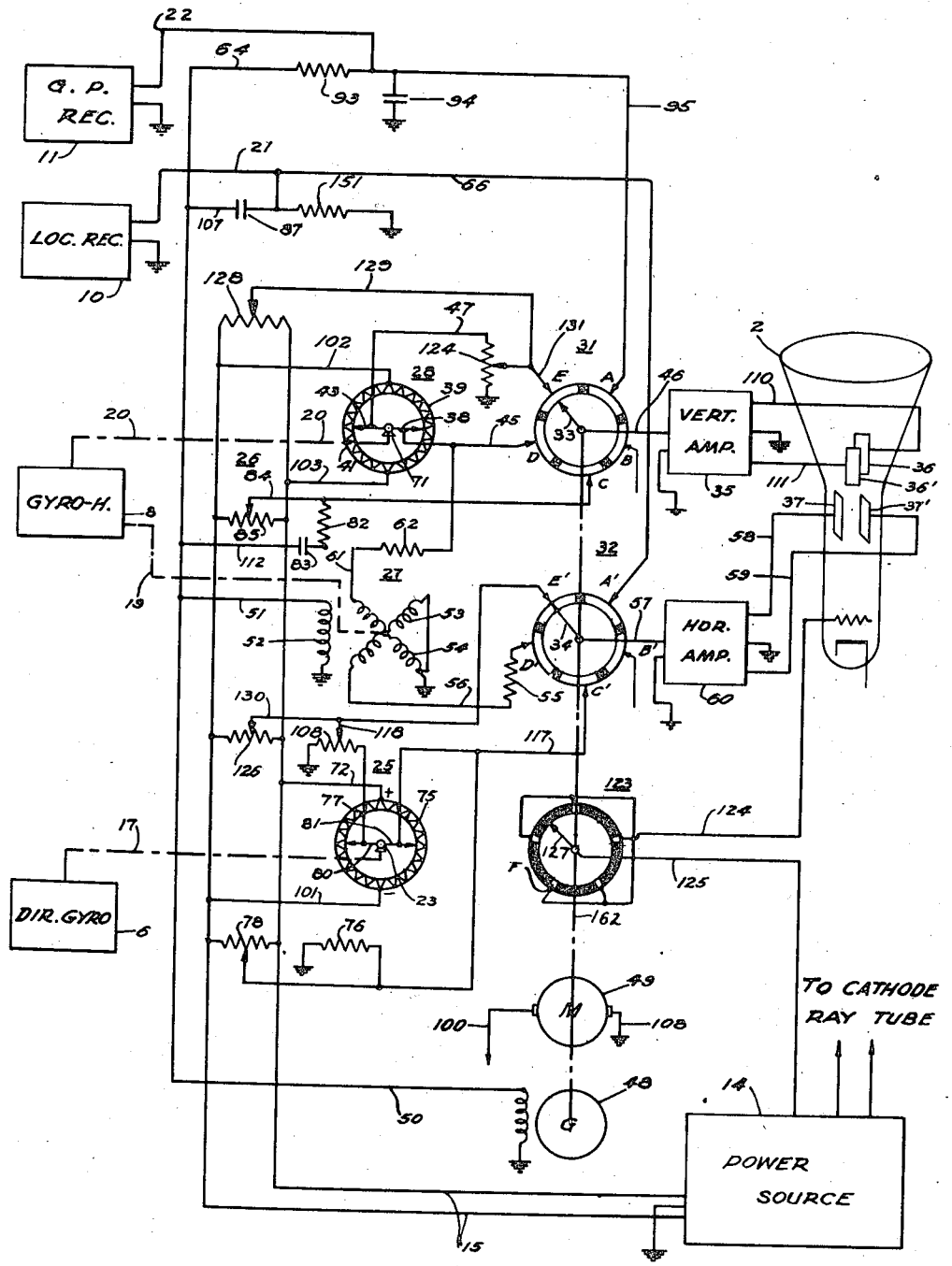
Fig. 2 is a schematic diagram showing details of the system illustrated in Fig. 1.

Referring now to the circuit diagram of Fig. 2, which is a specific embodiment of the indicating system of Fig. 1 chosen for illustrative convenience, the cathode ray tube 2 includes vertical and horizontal deflection electrodes 36, 36' and 37, 37', respectively, to which vertical and horizontal voltage amplifiers 35 and 60 are respectively connected. Amplifier 35 acts to amplify all vertical components of trace drawing or deflecting signals supplied in turn thereto by a brush 33 of a commutator 31 making successive contacts with a plurality of segments A–E to which the signals are constantly applied. A similar commutator 32 with coresponding segments A'—E' has its brush 34 connected to the horizontal amplifier 60 which latter device operates as a common stage of amplification for all horizontal components of trace drawing or deflecting signals.

The brushes 33 and 34 of commutators 31 and 32 are mounted on a shaft 162 for synchronous rotation by a motor 49 in order that the appropriate horizontal and vertical signals be simultaneously applied to create and displace traces in two dimensions on the tube face 4. A blanking commutator 123 is also provided with a brush 127 on shaft 162 and adapted to apply a negative grid bias to the cathode ray tube 2 for the purpose of extinguishing the electron beam during the brief periods while commutators 31 and 32 are being switched from one pair of segments to the next. This prevents any transient pulses or transition traces from appearing on the indicator face 4 to impair the pattern or confuse the flight information.

Direct and alternating voltages varying in accordance with aircraft flight conditions are applied to the commutator segments A, C, D, E and A', C', D', E' under control of the glide-path and localizer receivers 10 and 11, a potentiometer 25 coupled to the directional gyro 6, and a potentiometer 28 and a variable signal transformer 27 both coupled to the gyro-horizon 8. The direct voltages developed by the instrument landing receivers 10 and 11 regulate the horizontal and vertical components of displacement of a circular trace 9 (Fig. 1) formed by fixed-magnitude, quadrature-phased voltages. Transformer 27 provides alternating output voltages which draw the linear trace 7 (Fig. 1) substantially across the indicator face 4, in an angular disposition dependent upon the roll of the craft, and the vertical displacement of the trace 7 is controlled by the direct voltage from potentiometer 26. The potentiometer 25 provides a direct voltage varying as the azimuthal heading of the craft changes, and employed to control the lateral displacement of the vertical trace 5 which is drawn and vertically positioned by an alternating voltage and a direct voltage component applied through commutator 32 to the vertical deflection circuit of the tube 2.

The variable signal transformer 27 which may be a "Telegon" unit is mechanically coupled as schematically indicated by line 19 to the gyro-horizon 8, and so arranged that variation of coupling is produced between the primary winding 52 and the secondary windings 53, 54 of the transformer 27 in accordance with the roll of the aircraft. The primary winding 52 of the signal transformer 27 is connected through conductors 51 and 50 to the output winding of an alternating voltage generator 48 which is driven by the commutator driving motor 49. The orientation of the secondary windings 53 and 54 in the transformer 27 is such that when the aircraft is flying in a level attitude, the winding 53 is at a position of maximum coupling with the primary winding 52 and the other secondary winding 54 is entirely uncoupled from the primary winding 52. The secondary winding 53 is connected through a resistor 55 to commutator segment D', so that during intervals of contact of brush 34 with this segment, a large alternating voltage is applied between the horizontal deflection plates 37 and 37' of the cathode ray tube 2.

The other secondary winding 54 of the transformer 27 is connected through a resistor 62 to commutator segment D, which is connected also to a rotary arm 38 of potentiometer 28. When the aircraft is in a banking attitude, the winding 54 is coupled to the winding 52 in such a way as to produce an alternating voltage component between vertical deflection plates 36 and 36' cophasal with the alternating voltage between horizontal deflection plates 37 and 37', in such a manner that the "horizon" line or trace 7 is produced on the cathode ray tube in a truly horizontal angular orientation, regardless of the attitude of the aircraft.

The rotary arms 38 and 43 of the potentiometer 28 are mechanically coupled to the gyro-horizon 8, as schematically indicated at 20, in such a way that the positioning of the arms 38 and 43 relative to the potentiometer stator resistance elements 39, 41 is regulated according to the pitch of the aircraft. Equal direct voltages of opposite polarities are applied by power source 14 through conductors 15 and conductors 102, 103 to diametrically opposite points on the resistance elements 39, 41. The coupling link 20 between the gyro-horizon 8 and the potentiometer 28 is so adjusted that during normal level flight of the aircraft, the arms 38 and 43 are midway between the input voltage terminals of resistance elements 39 and 41 so that during level flight, the arms 38 and 43 are at ground potential. When the aircraft is in a gliding attitude or a climbing attitude, however, a D.C. component is applied to commutator segment D in addition to the alternating voltage component supplied thereto by winding 54 and, accordingly, the horizon line 7 produced on the cathode ray tube 2 is deflected upward or downward in accordance with the variations of pitch of the craft.

The potentiometer 25 having stator resistance elements 75, 77 and rotary contact arms 80, 81 is coupled to the directional gyroscope 6 as indicated schematically at 17. The diametrically opposite terminals of the stator resistance elements 75 and 77 are connected through conductors 72 and 101 and conductors 15 to the equipotential, opposite-polarity terminals of the power source 14. The potentiometer 25 is so arranged that contact arm 81 supplies to commutator segment C' a direct output voltage varying in accordance with the azimuthal heading of the aircraft. A manually controlled potentiometer 78 may also be connected to commutator segment C' to provide a manually controllable direct voltage component for fixing the azimuthal heading at which commutator segment C' is maintained at ground potential. Commutator segment C is supplied with a preset direct voltage component by means of potentiometer 85 connected between conductors 15, and is supplied with a constant alternating voltage component through conductor 112, capacitor 83 and resistor 82. The potentiometer arm 84 is adjusted to maintain the azimuthal direction indicating trace 5 at a suitable height on the indicator face 4, and the alternating voltage component supplied through capacitor 83 and resistor 82 is made sufficient to fix the length of trace 5 as desired.

As the aircraft turns to the right or left from a desired heading, relative movement between the arm 23 and the stator resistance element 75 of potentiometer 25 causes a variation of the direct voltage applied between horizontal deflection plates 37 and 37' during the intervals of contact of brushes 33 and 34 with the stator segments C and C', in such a manner as to indicate the change of heading of the craft by movement of the vertical trace 5 to the right or left of its normal position of symmetry about the vertical center line through the indicator face 4.

During normal flight of the aircraft, the horizon trace 7 and the directional trace 5 are relied upon for keeping the pilot fully informed as to the attitude of the aircraft, i. e., as to the roll and pitch and as to the azimuthal heading of the craft.

For indicating the displacement of the craft from a desired path, e. g. from such a desired line of descent to an airport as may be defined by radio beams distinctively modulated and transmitted from the airport, commutator segments A and A' are provided for cooperation with the glide path receiver 11 and the localizer receiver 10, for positional control of the circular trace 9. Circle 9 is deflected horizontally in accordance with positional variations of the craft relative to the localizer zone and vertically in accordance with displacement of the craft from the glide path zone determined by the radio instrument landing system. The circle 9 is generated by the application to the vertical and horizontal deflection plates of alternating voltage components in phase quadrature and of such relative values as to produce equal maximum cathode ray deflections horizontally and vertically. For this purpose, the alternating voltage supplied by generator 48 is applied to a capacitor 87 and a resistor 151 connected between conductor 50 and ground, and to another series circuit including a resistor 93 and capacitor 94 also connected between conductor 50 and ground. The impedance values of the capacitors 87 and 94 and the resistors 93 and 151 are selected to provide 90° relative phase shift between the alternating voltage components supplied to commutator segments A and A'. Preferably, the generator 48 is driven by the motor 49 through shaft 162, and the frequency of the alternating voltage developed by the generator is so related to the rotation speed of shaft 162 and the circular extent of segments A, C and D and segments A', C' and D' that the voltage supplied to conductor 50 varies through a complete cycle, or through an integral number of cycles, during the interval of engagement of brushes 33 and 34 with a pair of the above segments. Under such a condition, circular trace 9 and linear traces 5 and 7 are free from objectionable discontinuities of form or intensity.

The direct output voltage terminal of the glide path receiver 11 is connected through conductor 22 to the junction of resistor 93 and capacitor 94 and to commutator segment A and the direct output voltage terminal of the localizer receiver 10 is similarly connected through a conductor 21 to the junction of capacitor 87 and resistor 151 and to commutator segment A'.

As the craft moves above or below the glide path defined by the radio beams transmitted from the airport, the direct voltage applied by receiver 11 causes a proportionate deflection of the circle 9 downward or upward on the indicator face 4. Similarly, as the craft moves to the right or left of the localizer course zone, the resultant varying direct voltage component applied between deflection plates 37 and 37' during the interval of contact of brush 34 with commutator segment A' results in movement of the circle 9 to the left or right on indicator face 4.

The sensing of the output voltages supplied by the glide path receiver 11 and the localizer receiver 10 is such that the circle 9 is deflected upward as the aircraft moves below the radio defined landing path, and is deflected to the observer's right on the screen 4 as the aircraft moves to the left of the landing path.

In accordance with the present invention, a segment E is incorporated in commutator 31 and a corresponding segment E' is incorporated in commutator 32, and to these segments are applied beam deflection voltages so regulated according to the pitch and the azimuthal heading of the aircraft that when the circle 9 is displaced from the center of the screen indicating a departure from the landing path, an appropriate shift of azimuthal heading and pitch of the craft for returning to the landing path is indicated by the movement of the distinctive attitude dot or spot 12 into concentric positional relation with the circle 9. For regulating the vertical displacement of the spot 12 from the center of the screen, an arm 43 diametrically opposite the arm 38 of potentiometer 28 is provided for cooperation with the resistance element 41 to produce a direct voltage varying in an opposite sense to the voltage of arm 38. This direct voltage is transmitted by conductor 47 to a resistor 124 which may be arranged as a potentiometer for regulating the vertical sensitivity of movement of the spot 12.

Another manual control potentiometer 128 may be provided with its stator resistance element connected between conductors 15 and its movable arm connected through a conductor 129 to the arm of potentiometer 124 and to commutator segment E by connection 131 for a manual adjustment of the dot 12 to the center of the indicator face 4 when the pitch of the aircraft is adjusted for normal progress along the glide path.

A similar arrangement including potentiometer arm 80 and stator resistance element 77, cooperating with a sensitivity control potentiometer 108, 118, and a positional control potentiometer 128 with arm 130 is connected to the commutator segment E' for controlling the horizontal deflection of the spot 12 in accordance with variations of azimuthal heading of the aircraft.

As the aircraft approaches an airport, it is flown into the vicinity of the landing path at an appreciable distance from the airport. The potentiometer arm 78 is adjusted for a neutral position of the direction indicator trace 5 while the heading of the aircraft is parallel with the known heading of the landing runway. The movable arm 130 of potentiometer 126 may also be adjusted for moving the spot 12 to the middle of the indicator face 4.

Then, when the aircraft attitude has been adjusted for a rate of descent calculated to maintain the craft in a glide along the landing path, the movable arm of potentiometer 128 is positioned for maintaining the dot 12 midway between the vertical limits of the indicator face 4 and, thus, for positioning the dot at the center of the face 4 when the aircraft attitude is correct in pitch and azimuth for descent along a line parallel to the instrument landing path.

When a departure of the aircraft from the instrument landing path is indicated by a departure of circle 9 from the center of the screen, the operator then varies the attitude of the craft in such a way as to cause the dot 12 to move into concentric relation with the circle 9, and thereafter he so regulates the attitude of the craft as to maintain the dot 12 concentric with the circle 9. Consequently, the variations of aircraft attitude from a normal glide attitude are made proportionate to the variations of aircraft displacement from the landing path, so that an asymptotic return of the craft to the path is provided simply in reliance upon the relative positions of the spot 12 and the circle 9, and violent hunting is avoided.

Examples of the interpretation of the indications provided with the present invention are shown in Figs. 3 to 6. In Fig. 3, the position of the circle 9 above and to the right of the center of the screen indicates that the radio beam landing path is above and to the right of the airplane. The position of the dot 12 remote from the circle 9 indicates that the attitude of the craft has not been regulated in accordance with the displacement indicated by the position of circle 9. In fact, the position of the dot 12 in the sector of the screen 4 opposite the sector containing the circle 9 indicates that the attitude of the craft must be varied through the normal attitude for a glide along the landing path to a nose-up attitude and a rightwardly deflected azimuthal heading for a greatly decreased rate of descent and for progress to the right toward the landing path.

As is shown clearly in Fig. 3, the sensing of the dot 12 is opposite to the sensing of conventional azimuthal and pitch indicating traces 5 and 7, respectively. From these attitude responsive traces, it is readily seen that the craft is steeply inclined for rapid descent and that its azimuthal heading is to the left of the bearing of the landing path. Maintaining such an attitude of the craft would cause an even greater departure from the landing path.

The pilot in reliance upon an indicator with a face view such as that presented in Fig. 3 changes the attitude of the plane for reduced descent, and turns rightwardly until the attitude dot 12 takes a position concentric with the circle 9 as illustrated in Fig. 4. Such an attitude, if maintained indefinitely, would result in flight along a line intersecting the runway at an acute angle. The pilot actually does not persist long in this attitude, however, because his approach toward the landing path is accompanied by movement of the circle 9 toward the center of the screen, and the pilot manipulates the craft in such a way as to maintain the dot 12 concentric with the circle 9.

Fig. 5 illustrates the appearance of the indicator during this process, after the abrupt readjustment of craft attitude to bring the dot 12 into the circle 9, and subsequent maintenance of the dot 12 centrally positioned within circle 9, has brought the craft appreciably nearer to the landing path. Further maintainence of the dot 12 centrally positioned within the circle 9 eventually brings the craft into the landing path with its attitude properly adjusted for continuance along the path.

Fig. 6 illustrates a condition in which the aircraft is directly beneath the landing path and the pitch of the craft has accordingly been adjusted for less than normal rate of descent, in order that the craft will rapidly approach the landing path.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an aircraft flight indicating system, directive means establishing a reference heading, signal generating means responsive to said directive means for providing an attitude signal in accordance with craft deviation from said reference heading, a cathode ray tube having a fluorescent screen adapted to be excited by an electron beam, and beam generating and deflecting means, a second signal generating means for providing a signal in accordance with craft deviation from said reference plane, means for successively applying said attitude and positional signals to said deflecting means for forming distinctive attitude and position indicia respectively on said screen to indicate the attitude and position of said aircraft, said last-named means being so connected to said cathode ray tube as to deflect said attitude indicium and said position indicium from a common reference zone by substantially parallel displacements proportional to departures from a desired attitude or heading and from said reference plane, respectively, corresponding directions of said displacements representing a direction of the craft toward said reference plane, whereby correlation of the craft attitude with craft position for achieving an asymptotic approach to said line of flight is revealed by positional coincidence of said attitude and position indicia.

2. In an aircraft flight indicating system, directive means establishing a reference heading, signal generating means responsive to said directive means for providing an attitude signal in accordance with craft deviation from said reference heading, an indicator with deflecting means producing indicia, means establishing a reference plane for said craft, a second signal generating means for providing an attitude signal in accordance with craft deviation from said reference plane, receiving means responsive to directive radiant energy for providing position signals in accordance with deviation from a predetermined line of flight, means for similarly sensing and successsively applying said attitude and position signals respectively to said deflecting means for forming compound attitude indicium and a position indicium respectively on said indicator to indicate the attitude and position of said aircraft, said last-named means being so arranged that said indicia are in neutral coincidence when the craft is progressing normally along said predetermined line of flight and are displaced but coincident when the craft is displaced from but headed toward said line of flight, whereby correlation of the craft attitude with craft position for achieving an asymptotic approach to said line of flight is revealed by coincidence of said attitude and position indicia.

3. In an aircraft flight indicating system, the combination comprising an indicator with a face, exhibiting means for producing independent indications on the face of the indicator in normally symmetrical relation, means for supplying signals corresponding to craft displacement from a predetermined path of travel to one of said exhibiting means to give a position indication, means for supplying signals corresponding to the azimuthal and pitch attitudes of the craft to another one of said exhibiting means to give a compound attitude indication, said indications having a common established zero signal position, and said means for supplying said signals to said exhibiting means being connected in such senses that a convergence of the craft toward said predetermined path suitable to overcome an instant deviation therefrom is revealed by equal and similarly directed displacements of said indications from their zero signal position.

4. In an aircraft flight indicating system, the combination comprising means for generating a signal dependent upon the deviation in position of a craft from a predetermined path of travel, means for generating signals dependent upon the divergence in the attitude of said craft from the direction of said predetermined path, indicating means for providing an indication of craft attitudes and a position indication relative to coincident zero signal positions, and means for supplying said signals to said indicating means in such sense that a convergence of the craft toward said predetermined path suitable to overcome an instant deviation therefrom is revealed by said position indication and the indication indicative of the craft attitude being in coincidence.

5. In an aircraft flight indicating system, the combination comprising means for generating a signal dependent upon the deviation in position of a craft from a predetermined path of travel, means for generating signals dependent upon the divergence in the azimuthal and pitch attitudes of said craft from the direction of said predetermined path, indicating means for providing a position indication and a single indication indicative of said craft attitudes relative to zero signal positions of said indications, means for apportioning said signals to said indicating means in such proportion that a convergence of the craft toward said predetermined path suitable to overcome an instant deviation therefrom is revealed by equal displacements of said indications from their respective zero signal positions, and means for sensing said signals so that said indications approach each other when said craft is turned to a heading directed toward said course.

6. In an aircraft flight indicating system, the combination comprising means for generating a signal dependent upon the deviation in position of a craft from a predetermined path of travel, means for generating a signal dependent upon the divergence in attitude of said craft from the direction of said predetermined path, indicating means having substantially coincident zero signal positions for providing attitude and position indications, and means for supplying said signals to said indicating means in such sense that convergence of the craft toward said predetermined path suitable to overcome an instant deviation therefrom is revealed by a mutual approach of the indications.

7. In an aircraft flight indicating system, the combination comprising means for generating a signal dependent upon the deviation in position of a craft from a predetermined path of travel, means for generating a signal dependent upon the divergence in attitude of said craft from the direction of said predetermined path, indicating means having adjacent zero signal positions for providing attitude and position indications, and means for apportioning said signals to said indicating means in such proportion that a convergence of the craft toward said predetermined path suitable to overcome an instant deviation therefrom is revealed by equal and similarly directed displacements of said indications from their respective zero signal positions.

8. In a craft progress indicating system, the combination comprising means for generating a signal dependent upon the deviation in position of a craft from a predetermined path of travel, means for generating a signal dependent upon the divergence in attitude of said craft from the direction of said predetermined path, indicating means having zero signal positions for providing attitude and position indications, and means for supplying said signals to said indicating means in such proportion and sense that a convergence of the craft toward said predetermined path suitable to overcome an instant deviation therefrom is revealed by equal displacements of said indications from their respective zero signal positions.

9. Apparatus for guiding a craft to and along a predetermined course, comprising an instrument having first and second movable indicia normally juxtapositioned at a common reference position, means for deflecting said first indicium from said reference position in a direction and for a distance corresponding to the direction and extent of displacement of a craft from a predetermined course, and means for deflecting said second indicium from said reference position in a direction and for a distance corresponding to the sense and the extent of departure of the craft attitude from the normal attitude which produces craft movement parallel to said course, said last means and said first means being so connected with said instrument that said indicia are deflected in the same direction when the craft is displaced from said course and is headed toward said course.

10. Apparatus for guiding a craft to and along a predetermined course, comprising an instrument having first and second movable indicia normally juxtapositioned at a common reference position, means for deflecting said first indicium laterally from said reference position in a direction and for a distance corresponding to the direction and extent of the horizontal component of displacement of a craft from a predetermined course, and means for deflecting said second indicium laterally from said reference position in a direction and for a distance corresponding to the sense and the extent of departure of the craft azimuthal heading from a heading substantially parallel to said course, said first indicium deflecting means and said second indicium deflecting means being so connected with said instrument that said indicia are deflected in the same direction when the craft is displaced from said course and is headed toward said course.

11. Apparatus for guiding a craft to and along a predetermined course, comprising an instrument having first and second movable indicia normally juxtapositioned at a common reference position, means for deflecting said first indicium upward or downward from said reference position in a direction and for a distance corresponding to the direction and extent of the vertical component of displacement of a craft from a predetermined course and means for deflecting said first indicium upward or downward from said reference position in a direction and for a distance corresponding to the sense and the extent of departure of the craft attitude from a normal pitch producing craft movement parallel to said course, said first indicium deflecting means and said second indicium deflecting means being so connected with said instrument that said indicia are deflected in the same direction when the craft is displaced from said course and is headed toward said course.

12. Apparatus for guiding a craft to maintain a predetermined condition in craft progress, comprising an instrument having first and second movable indicia normally aligned at a neutral reference position, means for deflecting said first indicium from said reference position in a direction and for a distance corresponding to the direction and extent of departure of said craft from said predetermined condition, means for deflecting said second indicium from the neutral position in direction and extent, accordingly as the craft is maneuvered for change thereof with respect to said predetermined condition, said first indicium deflecting means and said second indicium deflecting means being so connected with said instrument that said indicia are deflected in the same direction when the craft is being maneuvered in such a way as to restore it to said predetermined condition.

THOMAS M. FERRILL, Jr.

REFERENCES CITED

The following references are of record in the file of this patent:

UNITED STATES PATENTS

| Number | Name | Date |
| --- | --- | --- |
| 2,262,033 | Moseley | Nov. 11, 1941 |
| 2,262,245 | Moseley et al. | Nov. 11, 1941 |
| 2,400,232 | Hall | May 14, 1946 |
| 2,405,231 | Newhouse | Aug. 6, 1946 |

FOREIGN PATENTS

| Number | Country | Date |
| --- | --- | --- |
| 516,567 | Great Britain | Jan. 5, 1940 |